United States Patent
Hu et al.

(10) Patent No.: US 11,095,408 B2
(45) Date of Patent: Aug. 17, 2021

(54) GENERATING REFERENCE SIGNAL(S) USING ZADOFF-CHU SEQUENCE(S)

(71) Applicant: HUAWEI TECHNOLOGIES CO., LTD., Guangdong (CN)

(72) Inventors: Yuanzhou Hu, Shanghai (CN); Mengying Ding, Shanghai (CN); Zongjie Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/460,201

(22) Filed: Jul. 2, 2019

(65) Prior Publication Data

US 2019/0327053 A1    Oct. 24, 2019

Related U.S. Application Data

(63) Continuation of application No. PCT/CN2018/071464, filed on Jan. 4, 2018.

(30) Foreign Application Priority Data

Jan. 6, 2017    (CN) .......................... 201710011406.3

(51) Int. Cl.
    *H04L 5/00*    (2006.01)
(52) U.S. Cl.
    CPC .......... *H04L 5/0048* (2013.01); *H04L 5/0005* (2013.01)
(58) Field of Classification Search
    CPC . H04L 5/0048; H04L 5/0005; H04L 27/2613; H04L 5/00
    See application file for complete search history.

(56) References Cited

U.S. PATENT DOCUMENTS

| 8,295,389 B2 * | 10/2012 | Han | H04L 7/0087 |
| | | | 375/295 |
| 10,085,226 B2 * | 9/2018 | Xia | H04L 27/2607 |

(Continued)

FOREIGN PATENT DOCUMENTS

| CN | 101809881 A | 8/2010 |
| CN | 101917356 A | 12/2010 |

(Continued)

OTHER PUBLICATIONS

IEEE Transactions on Wireless Communications, vol. 14, No. 3, Mar. 2015: Timing and Frequency Synchronization for OFDM Downlink Transmissions Using Zadoff-Chu Sequences—Gul et al. (Year: 2015).*

(Continued)

*Primary Examiner* — Ian N Moore
*Assistant Examiner* — Rushil Parimal Sampat
(74) *Attorney, Agent, or Firm* — Womble Bond Dickinson (Us) LLP

(57) ABSTRACT

Disclosed is a reference signal transmission method and a device. The method includes converting, by a sending device, a frequency domain reference signal from frequency domain to time domain, to generate a time domain reference signal. The frequency domain reference signal includes a reference signal sequence mapped to a frequency domain resource. The reference signal sequence is determined based on a Zadoff-Chu (ZC) sequence, and a length value of the ZC sequence is selected from at least two length values. The method includes sending, by the sending device, the time domain reference signal. According to the reference signal transmission method, one ZC sequence is selected from at least two ZC sequences with different lengths to generate the reference signal sequence, so that the generated reference signal sequence is characterized by a low PAPR and an low (Continued)

S410. A sending device converts a frequency domain reference signal from frequency domain to time domain, to generate a time domain reference signal, where the frequency domain reference signal includes reference signal sequences mapped to a frequency domain resource S420. The sending device sends the time domain reference signal RCM, and is used to generate a reference signal, to improve data transmission performance.

17 Claims, 4 Drawing Sheets

(56) References Cited

U.S. PATENT DOCUMENTS

| | | | |
|---|---|---|---|
| 2010/0195637 A1 | 8/2010 | Iwai et al. | |
| 2010/0284265 A1 | 11/2010 | Ogawa et al. | |
| 2017/0041892 A1 | 2/2017 | Xia et al. | |
| 2019/0215209 A1* | 7/2019 | Tang | H04L 27/2613 |

FOREIGN PATENT DOCUMENTS

| | | |
|---|---|---|
| CN | 102769592 A | 11/2012 |
| CN | 103873215 A | 6/2014 |
| CN | 104202712 A | 12/2014 |
| EP | 2194653 A1 | 6/2010 |
| WO | 2010020291 A1 | 2/2010 |
| WO | 2011127007 A1 | 10/2011 |

OTHER PUBLICATIONS

"Timing and Frequency Synchronization for OFDM Downlink Transmissions Using Zadoff-Chu Sequences"—Malik Muhammad Usman Gul, Xiaoli Ma, Senior Member, IEEE, and Sungeun Lee (IEEE Transactions on Wireless Communications, vol. 14, No. 3, Mar. 2015) (Year: 2015).*

Huawei et al.,"Functionahties and design of reference signal for demodulation of UL Channels",3GPP TSG RAN WG1 Meeting #87 R1-1611246,Reno, USA, Nov. 14-18, 2016,total 5 pages.

Ericsson,"On block RS design enabling low CM",3GPP TSG-RAN WG1#87 R1-1612344,Reno, USA Nov. 14-18, 2016,total 3 pages.

XP032677538 Felipe A. P de Figueiredo et al.,"Efficient Frequency Domain Zadoff-Chu Generator with Application to LTE and LTE-A Systems",2014 International Telecommunications Symposium (ITS),total 5 pages.

Ericsson Concatenated block RS design 3GPP TSG-RAN WG1#86bis R1-1609772, Lisbon, Portugal Oct. 10-14, 2016 total 3 pages.

3GPP TS 36.211 V14.1.0 (Dec. 2016), 3rd Generation Partnership Project; Technical Specification Group Radio Access Network; Evolved Universal Terrestrial Radio Access (E-UTRA); Physical channels and modulation(Release 14), 175 pages.

* cited by examiner (a) Cyclic extension (b) Truncation

GENERATING REFERENCE SIGNAL(S) USING ZADOFF-CHU SEQUENCE(S)

CROSS-REFERENCE TO RELATED APPLICATIONS

This application is a continuation of International Application No. PCT/CN2018/071464, filed on Jan. 4, 2018, which claims priority to Chinese Patent Application No. 201710011406.3, filed on Jan. 6, 2017. The disclosures of the aforementioned applications are hereby incorporated by reference in their entireties.

TECHNICAL FIELD

This application relates to the communications field, and in particular, to a reference signal transmission method and an apparatus in a wireless communications system.

BACKGROUND

In a wireless communications system, a reference signal (RS), also referred to as a pilot signal, is a predefined signal sent by a sending device to a receiving device on a predefined resource. The receiving device may obtain channel-related information based on the received reference signal, to complete channel estimation or channel measurement. A channel measurement result may be used for resource scheduling and link adaptation, and a channel estimation result may be used by the receiving device to demodulate data. To obtain accurate channel-related information, different reference signals usually need to be orthogonal. Usually a plurality of mutually orthogonal reference signals may be provided in a time division manner, a frequency division manner, a code division manner, or the like. In a long term evolution (LTE) system, an uplink reference signal includes an uplink demodulation reference signal (DMRS) and an uplink sounding reference signal (SRS); and a downlink reference signal includes a cell-specific reference signal (CRS), a downlink DMRS, a channel state information-reference signal (CSI-RS), a multimedia broadcast multicast service single frequency network reference signal (MBSFN RS), and a positioning reference signal (PRS).

In an existing LTE system, for each reference signal sequence with a fixed length, 30 or 60 signal sequences are defined in consideration of a network deployment requirement. Because of some of the signal sequences, when a transmit power of a cell-edge user is limited, accuracy of measurement of the channel-related information by the receiving device is reduced, and data transmission performance deteriorates.

SUMMARY

This application provides a reference signal sequence generation method, a reference signal transmission method and an apparatus, to improve data transmission performance.

According to a first aspect, a reference signal sequence generation method is provided, and includes: determining a reference signal sequence based on a Zadoff-Chu (ZC) sequence, where a length value of the ZC sequence is selected from at least two length values. The reference signal sequence may be generated by a module of a sending device, or may be generated by a module of a receiving device.

According to the reference signal sequence generation method in the first aspect, one ZC sequence is selected from at least two ZC sequences with different lengths to generate the reference signal sequence, so that the generated reference signal sequence is characterized by a low peak-to-average ratio (PAPR) and a low raw cubic metric (RCM). The reference signal sequence is used to generate a reference signal, thereby improving data transmission performance.

In one embodiment of the first aspect, the ZC sequence is $X_q(m)$, and $X_q(m)$ is determined according to $$X_q(m) = e^{-j\frac{\pi \cdot q \cdot m \cdot (m+1)}{M_k}},$$

where m represents a sequence number of an element of the ZC sequence, m is an integer and $0 \leq m \leq M_k - 1$, $M_k$ represents the length value of the ZC sequence, k is an integer and $0 \leq k \leq K-1$, K represents a quantity of length values of the ZC sequence, K is an integer greater than 1, q represents a value of a root of the ZC sequence, and q and $M_k$ are relatively prime.

In one embodiment of the first aspect, when the length value $M_k$ of the ZC sequence is determined, a value of q is as follows: q=1; or q=$M_k$−1; or $$q = \left\lfloor \frac{M_k}{Q} + 0.5 \right\rfloor; \text{ or } q = M_k - \left\lfloor \frac{M_k}{Q} + 0.5 \right\rfloor,$$

where $\lfloor \ \rfloor$ represents rounding down, $$1 < Q \leq \left\lfloor \frac{M_k}{2} \right\rfloor,$$

and $M_k$ mod Q=1 or $M_k$ mod Q=Q−1. In this embodiment, the value of the root of the ZC sequence is determined by using the foregoing method, and the ZC sequence may be further generated by using $M_k$ and q. Further, the ZC sequence is used to generate the reference signal sequence, and the reference signal is correspondingly generated. The generated reference signal is characterized by a low PAPR/RCM. The reference signal is used for data transmission, thereby improving data transmission performance.

In one embodiment of the first aspect, when the length value $M_k$ of the ZC sequence is determined, a value of q is q=q' or q=$M_k$−q', where $M_k$ mod q'=1 or $M_k$ mod q'=q'−1, and $1 \leq q' \leq \lfloor M_k/2 \rfloor$. In this embodiment, when $M_k$ is determined, a value of a root of a ZC sequence that meets a low PAPR/RCM requirement may be determined.

In one embodiment of the first aspect, a length of the reference signal sequence is 48, a value of $M_k$ and the value of q of the ZC sequence are one type in a parameter value set, $M_k$ in the parameter value set has at least two different values, and the parameter value set includes at least two items of the following:

$M_k$=47 and q=1;
$M_k$=47 and q=8;
$M_k$=47 and q=12;
$M_k$=47 and q=14;
$M_k$=47 and q=16;
$M_k$=47 and q=17;
$M_k$=47 and q=19;
$M_k$=47 and q=21;
$M_k$=47 and q=23;
$M_k$=47 and q=24;
$M_k$=47 and q=26;
$M_k$=47 and q=28;

$M_k=47$ and $q=30$;
$M_k=47$ and $q=31$;
$M_k=47$ and $q=33$;
$M_k=47$ and $q=35$;
$M_k=47$ and $q=39$;
$M_k=47$ and $q=46$;
$M_k=87$ and $q=37$;
$M_k=87$ and $q=50$;
$M_k=117$ and $q=10$;
$M_k=117$ and $q=107$;
$M_k=125$ and $q=27$;
$M_k=125$ and $q=98$;
$M_k=129$ and $q=14$;
$M_k=129$ and $q=115$;
$M_k=151$ and $q=69$;
$M_k=151$ and $q=82$;
$M_k=223$ and $q=83$; and
$M_k=223$ and $q=140$.

In this embodiment, the sending device selects a group of values from the set of the value of $M_k$ and the value of q to generate the reference signal sequence.

In one embodiment of the first aspect, the reference signal sequence is $R_q(n)$, and $R_q(n)$ is determined according to $R_q(n)=e^{j \cdot \alpha \cdot n} X_q(n \mod M_k)$, where n is an integer and $0 \le n \le N-1$, N represents the length of the reference signal sequence, N is an integer greater than 1, $\alpha$ represents a phase of linear phase rotation, and a is a real number. In this embodiment, a quantity of reference signal sequences that meet a PAPR/RCM requirement can be further increased through linear phase rotation.

According to a second aspect, a reference signal transmission method is provided, and includes: converting, by a sending device, a frequency domain reference signal from frequency domain to time domain, to generate a time domain reference signal, where the frequency domain reference signal includes a reference signal sequence mapped to a frequency domain resource, the reference signal sequence is determined based on a ZC sequence, and a length value of the ZC sequence is selected from at least two length values; and sending, by the sending device, the time domain reference signal.

In one embodiment of the second aspect, the sending device generates the reference signal sequence by using the method according to any one of the first aspect or the possible embodiments of the first aspect.

According to the reference signal transmission method in the second aspect, one ZC sequence is selected from at least two ZC sequences with different lengths to generate the reference signal sequence. A reference signal is further generated, so that the generated reference signal is characterized by a low peak-to-average ratio (PAPR) and a low raw cubic metric (RCM), thereby improving data transmission performance.

In one embodiment of the second aspect, the frequency domain resource includes a first frequency domain resource group and a second frequency domain resource group, and the second frequency domain resource group and the first frequency domain resource group include a same quantity of basic time-frequency resource units and have no overlapping basic time-frequency resource unit; the reference signal sequence includes a first reference signal sequence and a second reference signal sequence; and the first reference signal sequence is mapped to the first frequency domain resource group, and the second reference signal sequence is mapped to the second frequency domain resource group. In a block reference signal scenario, the method in this implementation is applied, so that a PAPR/RCM of a block reference signal can be reduced, thereby improving data transmission efficiency.

According to a third aspect, a reference signal transmission method is provided, and includes: receiving, by a receiving device, a time domain reference signal; and converting, by the receiving device, the time domain reference signal from time domain to frequency domain, to generate a frequency domain reference signal, where the frequency domain reference signal includes a reference signal sequence mapped to a frequency domain resource, the reference signal sequence is determined based on a ZC sequence, and a length value of the ZC sequence is selected from at least two length values.

In one embodiment of the third aspect, the receiving device generates the reference signal sequence by using the method according to any one of the first aspect or the embodiments of the first aspect.

In a possible implementation of the third aspect, the frequency domain resource includes a first frequency domain resource group and a second frequency domain resource group, and the second frequency domain resource group and the first frequency domain resource group include a same quantity of basic time-frequency resource units and have no overlapping basic time-frequency resource unit; the reference signal sequence includes a first reference signal sequence and a second reference signal sequence; and the first reference signal sequence is mapped to the first frequency domain resource group, and the second reference signal sequence is mapped to the second frequency domain resource group.

According to a fourth aspect, a device is provided, and includes modules that perform the method according to any one of the first aspect or the embodiments of the first aspect.

According to a fifth aspect, a communications apparatus is provided, and includes a processing unit and a sending unit, to perform the method according to any one of the second aspect or the embodiments of the second aspect.

According to a sixth aspect, a communications apparatus is provided, and includes a processor, a memory, and a transceiver, to perform the method according to any one of the second aspect or the embodiments of the second aspect.

According to a seventh aspect, a communications apparatus is provided, and includes a processing unit and a sending unit, to perform the method according to any one of the third aspect or the embodiments of the third aspect.

According to an eighth aspect, a communications apparatus is provided, and includes a processor, a memory, and a transceiver, to perform the method according to any one of the third aspect or the embodiments of the third aspect.

According to a ninth aspect, a computer readable storage medium is provided. The computer readable storage medium stores an instruction, and when the instruction runs on a computer, the computer performs the method according to any one of the first aspect or the embodiments of the first aspect.

According to a tenth aspect, a computer readable storage medium is provided. The computer readable storage medium stores an instruction, and when the instruction runs on a computer, the computer performs the method according to any one of the second aspect or the embodiments of the second aspect.

According to an eleventh aspect, a computer readable storage medium is provided. The computer readable storage medium stores an instruction, and when the instruction runs on a computer, the computer performs the method according to any one of the third aspect or the embodiments of the third aspect.

According to a twelfth aspect, a computer program product including an instruction is provided. When the computer program product runs on a computer, the computer performs the method according to any one of the first aspect or the embodiments of the first aspect.

According to a thirteenth aspect, a computer program product including an instruction is provided. When the computer program product runs on a computer, the computer performs the method according to any one of the second aspect or the embodiments of the second aspect.

According to a fourteenth aspect, a computer program product including an instruction is provided. When the computer program product runs on a computer, the computer performs the method according to any one of the third aspect or the embodiments of the third aspect.

DESCRIPTION OF EMBODIMENTS

A sending device and a receiving device in the embodiments of this application may be any transmit end device and any receive end device that transmit data in a wireless manner. The sending device and the receiving device may be any devices having a wireless receiving and sending function, including but not limited to: a NodeB, an evolved NodeB, a base station in a 5th Generation (5G) communications system, a base station or a network device in a future communications system, an access node in a Wi-Fi system, a wireless relay node, a wireless backhaul node, and user equipment (UE). The UE may also be referred to as a terminal, a mobile station (MS), a mobile terminal (MT), or the like. The UE may communicate with one or more core networks over a radio access network (RAN), or may access a distributed network in a self-organizing or grant-free manner. The UE may access a wireless network in another manner for communication, or the UE may directly perform wireless communication with another UE. This is not limited in the embodiments of this application.

The sending device and the receiving device in the embodiments of this application may be deployed on land such as indoor or outdoor devices, handheld devices, or in-vehicle devices, or may be deployed on the water, or may be deployed on an airplane, a balloon, or a satellite in the sky. The UE in the embodiments of this application may be a mobile phone, a tablet computer (Pad), a computer having a wireless receiving and sending function, a virtual reality (VR) terminal device, an augmented reality (AR) terminal device, a wireless terminal in industrial control, a wireless terminal in self-driving vehicles, a wireless terminal in telemedicine (e.g., remote medical), a wireless terminal in a smart grid, a wireless terminal in transportation safety, a wireless terminal in a smart city, a wireless terminal in a smart home, or the like. An application scenario is not limited in the embodiments of this application.

Figure 1:
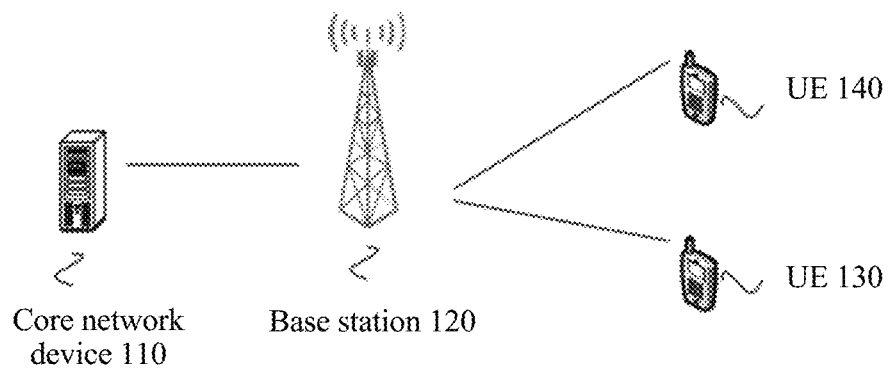
FIG. 1 is an architectural diagram of a communications system to which embodiments of this application are applied.

FIG. 1 is an architectural diagram of a communications system to which embodiments of this application are applied. As shown in FIG. 1, the communications system includes a core network device 110, a base station 120, UE 130, and UE 140 that are connected in a wireless manner, a wired manner, or another manner. The UE 130 and the UE 140 may be still or may be mobile. FIG. 1 is only an architectural diagram, and the communications system may further include one or more other network devices and/or terminal devices, which are not shown in FIG. 1.

The embodiments of this application may be applied to downlink data transmission, may be applied to uplink data transmission, or may be applied to device-to-device (D2D) data transmission. For the downlink data transmission, a sending device is a base station, and a corresponding receiving device is UE. For the uplink data transmission, a sending device is UE, and a corresponding receiving device is a base station. For the D2D data transmission, a sending device is UE, and a corresponding receiving device is also UE. This is not limited in the embodiments of this application.

In New Radio (NR) of a 5th Generation (5G) mobile communications system, a block reference signal method is proposed for a scenario in which a plurality of UEs or a plurality of transmit ports share a same or partially same time-frequency resource, to improve orthogonality between reference signals of different UEs or different transmit ports. In the block reference signal solution, a reference signal of each UE is divided into a plurality of blocks, and it is ensured that reference signals of different UEs are orthogonal within blocks, to ensure that the overall reference signals of the different UEs are orthogonal. After a block reference signal is introduced, time-frequency resources of two UEs may be shared by using a block size as a basic unit, and the time-frequency resources of the two UEs in spatial multiplexing do not need to completely overlap. Therefore, allocation of resources between UEs is more flexible.

However, a peak-to-average ratio (PAPR) and a raw cubic metric (RCM) of a reference signal may become larger due to introduction of the block reference signal method. Further, when a transmit power of a cell-edge user is limited, accuracy of measuring channel-related information by the receiving device is reduced, and data transmission performance is reduced.

In addition, during 5G standard discussion, it is also proposed that a frequency domain filter (e.g., spectrum shaping) is added after a discrete Fourier transform spread orthogonal frequency division multiplexing (DFT-S-OFDM) signal, to reduce a PAPR/RCM of the data signal. However, after the frequency domain filter is added to the DFT-S-OFDM data signal, the PAPR of the data signal may be lower than a PAPR of a reference signal, so that when a transmit power of a cell-edge user is limited, accuracy of measuring channel-related information by the receiving device is reduced, and data transmission performance is reduced.

An embodiment of this application provides a reference signal sequence generation method. When a reference signal sequence generated by using the method is applied to a communications system, a problem that a reference signal has a high PAPR is resolved, and data transmission performance can be further improved. The reference signal sequence may be generated by a module of a sending device, or may be generated by a module of a receiving device.

The reference signal sequence is determined based on a ZC sequence, and a length value of the ZC sequence is selected from at least two length values.

Specifically, the ZC sequence $X_q(m)$ is determined according to a formula (1):

$$X_q(m) = e^{-j\frac{\pi \cdot q \cdot m \cdot (m+1)}{M_k}}, \quad (1.)$$

where $0 \leq m \leq M_k-1$ and $0 \leq k \leq K-1$ (1.)

Herein, m represents a sequence number of an element of the ZC sequence, m is an integer and $0 \leq m \leq M_k-1$, $M_k$ represents the length value of the ZC sequence, $M_k$ may or may not be a prime number, k is an integer and $0 \leq k \leq K-1$, K represents a quantity of length values of the ZC sequence, K is an integer greater than 1, q represents a value of a root of the ZC sequence, and q and $M_k$ are relatively prime.

It may be understood that a sequence number of an array or a sequence, for example, a value of m and a value of k, may have different numbering schemes, and counting may start from 1 or 0. This is not limited in this embodiment of this application.

The ZC sequence determined based on q may also be referred to as a $q^{th}$ root ZC sequence whose length is $M_k$. The ZC sequence has a good autocorrelation. In other words, the sequence has a large autocorrelation peak. There is a good cross-correlation property between two ZC sequences that have a same length but different roots. In other words, a cross-correlation value is very small.

The ZC sequence determined according to the formula (1) is essentially a sequence in a ZC sequence set. The ZC sequence set includes at least two ZC sequences, and the length value $M_k$ of the ZC sequence in the sequence set has at least two different values.

Further, a base sequence (base sequence) $\bar{R}_q(n)$ of the reference signal sequence is generated based on the ZC sequence $X_q(m)$, and may be represented by using a formula (2):

$$\bar{R}_q(n) = X_q(n \bmod M_k) \quad (2.)$$

Figure 2:
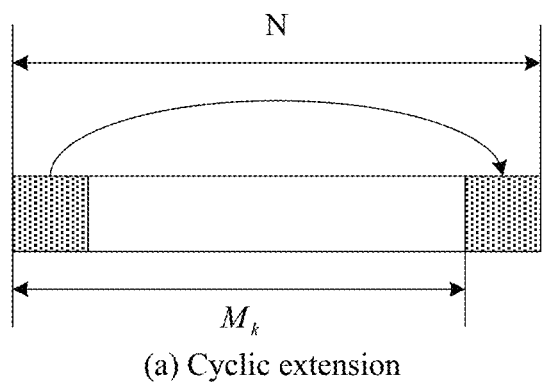
FIG. 2 is a diagram of generating a reference signal sequence by cyclically extending or truncating a ZC sequence according to an embodiment of this application.
Figure 2:
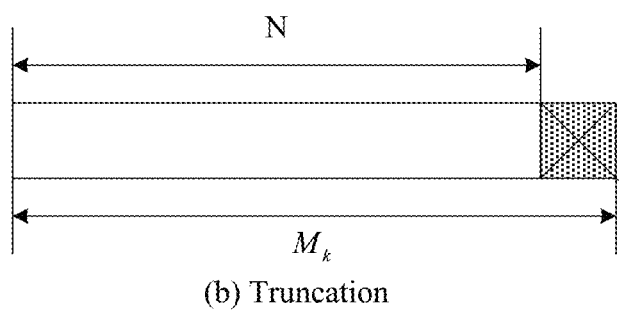

Herein, n is an integer and $0 \leq n \leq N-1$, N represents a length of the base sequence, and N is an integer greater than 1. As shown in a figure (a) in FIG. 2, when N is greater than $M_k$, the formula (2) may indicate that a reference signal sequence whose length is N is obtained by cyclically extending the ZC sequence whose length is $M_k$. As shown in a figure (b) in FIG. 2, when N is less than $M_k$, the formula (2) may indicate that a reference signal sequence whose length is N is obtained by truncating the ZC sequence whose length is $M_k$.

To further obtain more reference signal sequences, different linear phase rotation may be performed on the base sequence $\bar{R}_q(n)$ in the frequency domain. Different reference signal sequences obtained after different linear phase rotation is performed on a same base sequence are completely orthogonal to each other. Therefore, there is no interference between the reference signal sequences obtained through linear phase rotation. A reference signal sequence $R_q(n)$ is obtained after linear phase rotation is performed on the base sequence $\bar{R}_q(n)$, as shown in a formula (3):

$$R_q(n) = e^{j \cdot \alpha \cdot n} \bar{R}_q(n), \text{ where } 0 \leq n \leq N-1 \quad (3.)$$

Herein, $\alpha$ represents a phase of linear phase rotation, and $\alpha$ is a real number. Assuming that $\alpha=(c \cdot \pi)/6$, a value of c may range from 0 to 11. Therefore, 12 different mutually-orthogonal reference signal sequences may be obtained by performing different phase rotation on a base reference signal sequence. Linear phase rotation in the frequency domain is equivalent to cyclic shift (cyclic shift) in the time domain.

The formula (2) and the formula (3) may be combined to obtain a formula (4):

$$R_q(n) = e^{j \cdot \alpha \cdot n} X_q(n \bmod M_k), \text{ where } 0 \leq n \leq N-1 \quad (4.)$$

The ZC sequence can be uniquely determined by using a value of the parameter $M_k$ and a value of q. A ZC sequence that meets a low PAPR/RCM requirement may be obtained in two embodiments.

In one embodiment, a combination of the value of $M_k$ and the value of q is given by using a table or a parameter value set. In another embodiment, the value of $M_k$ is given, and the value of q is obtained through calculation by using a formula.

Figure 3:
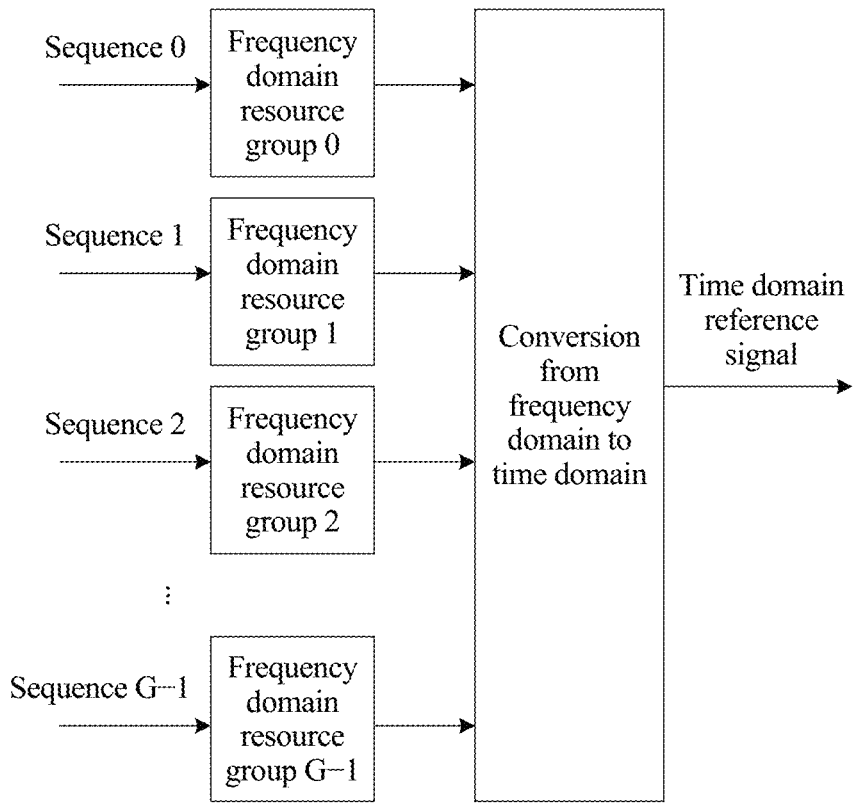
FIG. 3 is a block diagram of block reference signal transmission according to an embodiment of this application.

In a block reference signal application scenario shown in FIG. 3, in an example in which a length of each block is four resource blocks (RB) or 48 subcarriers, and 30 roots are required, assuming that a constraint condition is that an RCM of a reference signal sequence is less than 2.5 and that a maximum cross-correlation amplitude value is less than 0.35, $M_k$ and q that meet the constraint condition are shown in Table 1.

TABLE 1

| | Sequence number | | | | | | | | | |
|---|---|---|---|---|---|---|---|---|---|---|
| | 1 | 2 | 3 | 4 | 5 | 6 | 7 | 8 | 9 | 10 |
| $M_k$ | 47 | 47 | 47 | 47 | 47 | 47 | 47 | 47 | 47 | 47 |
| q | 1 | 8 | 12 | 14 | 16 | 17 | 19 | 21 | 23 | 24 |
| | Sequence number | | | | | | | | | |
| | 11 | 12 | 13 | 14 | 15 | 16 | 17 | 18 | 19 | 20 |
| $M_k$ | 47 | 47 | 47 | 47 | 47 | 47 | 47 | 47 | 87 | 87 |
| q | 26 | 28 | 30 | 31 | 33 | 35 | 39 | 46 | 37 | 50 |

TABLE 1-continued

| | Sequence number | | | | | | | | | |
|---|---|---|---|---|---|---|---|---|---|---|
| | 21 | 22 | 23 | 24 | 25 | 26 | 27 | 28 | 29 | 30 |
| $M_k$ | 117 | 117 | 125 | 125 | 129 | 129 | 151 | 151 | 223 | 223 |
| q | 10 | 107 | 27 | 98 | 14 | 115 | 69 | 82 | 83 | 140 |

In an example in which a length of each block is 4 RBs or 48 subcarriers and 60 roots are required, assuming that a constraint condition is that an RCM of a reference signal sequence is less than 3 and that a maximum cross-correlation amplitude value is less than 0.45, $M_k$ and q that meet the constraint condition are shown in Table 2.

TABLE 2

| | Sequence number | | | | | | | | | |
|---|---|---|---|---|---|---|---|---|---|---|
| | 1 | 2 | 3 | 4 | 5 | 6 | 7 | 8 | 9 | 10 |
| $M_k$ | 47 | 47 | 47 | 47 | 47 | 47 | 47 | 47 | 47 | 47 |
| q | 1 | 4 | 6 | 8 | 12 | 14 | 16 | 17 | 19 | 20 |

| | Sequence number | | | | | | | | | |
|---|---|---|---|---|---|---|---|---|---|---|
| | 11 | 12 | 13 | 14 | 15 | 16 | 17 | 18 | 19 | 20 |
| $M_k$ | 47 | 47 | 47 | 47 | 47 | 47 | 47 | 47 | 47 | 47 |
| q | 21 | 23 | 24 | 26 | 27 | 28 | 30 | 31 | 33 | 35 |

| | Sequence number | | | | | | | | | |
|---|---|---|---|---|---|---|---|---|---|---|
| | 21 | 22 | 23 | 24 | 25 | 26 | 27 | 28 | 29 | 30 |
| $M_k$ | 47 | 47 | 47 | 47 | 49 | 49 | 49 | 49 | 49 | 49 |
| q | 39 | 41 | 43 | 46 | 4 | 9 | 11 | 38 | 40 | 45 |

| | Sequence number | | | | | | | | | |
|---|---|---|---|---|---|---|---|---|---|---|
| | 31 | 32 | 33 | 34 | 35 | 36 | 37 | 38 | 39 | 40 |
| $M_k$ | 51 | 51 | 53 | 53 | 53 | 53 | 57 | 57 | 75 | 75 |
| q | 22 | 29 | 15 | 21 | 32 | 38 | 1 | 56 | 29 | 46 |

| | Sequence number | | | | | | | | | |
|---|---|---|---|---|---|---|---|---|---|---|
| | 41 | 42 | 43 | 44 | 45 | 46 | 47 | 48 | 49 | 50 |
| $M_k$ | 77 | 77 | 79 | 79 | 79 | 79 | 79 | 79 | 81 | 81 |
| q | 15 | 62 | 7 | 12 | 37 | 42 | 67 | 72 | 37 | 44 |

| | Sequence number | | | | | | | | | |
|---|---|---|---|---|---|---|---|---|---|---|
| | 51 | 52 | 53 | 54 | 55 | 56 | 57 | 58 | 59 | 60 |
| $M_k$ | 89 | 89 | 93 | 93 | 93 | 93 | 99 | 99 | 283 | 283 |
| q | 16 | 73 | 6 | 34 | 59 | 87 | 6 | 93 | 67 | 216 |

In an example in which a length of each block is 2 RBs or 24 subcarriers and 30 roots are required, assuming that a constraint condition is that an RCM of a reference signal sequence is less than 3 and that a maximum cross-correlation amplitude value is less than 0.55, $M_k$ and q that meet the constraint condition are shown in Table 3.

TABLE 3

| | Sequence number | | | | | | | | | |
|---|---|---|---|---|---|---|---|---|---|---|
| | 1 | 2 | 3 | 4 | 5 | 6 | 7 | 8 | 9 | 10 |
| $M_k$ | 23 | 23 | 23 | 23 | 23 | 23 | 23 | 23 | 23 | 23 |
| q | 1 | 4 | 6 | 8 | 9 | 11 | 12 | 14 | 15 | 17 |

TABLE 3-continued

| | Sequence number | | | | | | | | | |
|---|---|---|---|---|---|---|---|---|---|---|
| | 11 | 12 | 13 | 14 | 15 | 16 | 17 | 18 | 19 | 20 |
| $M_k$ | 23 | 23 | 29 | 29 | 39 | 39 | 39 | 39 | 43 | 43 |
| q | 19 | 22 | 1 | 28 | 16 | 17 | 22 | 23 | 9 | 12 |

| | Sequence number | | | | | | | | | |
|---|---|---|---|---|---|---|---|---|---|---|
| | 21 | 22 | 23 | 24 | 25 | 26 | 27 | 28 | 29 | 30 |
| $M_k$ | 43 | 43 | 45 | 45 | 47 | 47 | 51 | 51 | 79 | 79 |
| q | 31 | 34 | 19 | 26 | 9 | 38 | 6 | 45 | 25 | 54 |

Sequence numbers in Table 1 to Table 3 are only examples of sequence numbers of combinations of the value of $M_k$ and the value of q, and do not limit other sequences of the combinations of the value of $M_k$ and the value of q. The sequence numbers may have another sequence numbering format. For example, numbering may start from 0, or may be performed in another sequence. For example, in Table 1, the sequence number 1 corresponding to $M_k$=47 and q=1 may be 0, 30, or another value. In addition, there may be no sequence number in Table 1 to Table 3.

When a length of the reference signal sequence is 48, the value of $M_k$ and the value of q of the ZC sequence in this embodiment of this application are one type in a parameter value set, $M_k$ in the parameter value set has at least two different values, and the parameter value set includes at least two items of the following:

$M_k$=47 and q=1;
$M_k$=47 and q=8;
$M_k$=47 and q=12;
$M_k$=47 and q=14;
$M_k$=47 and q=16;
$M_k$=47 and q=17;
$M_k$=47 and q=19;
$M_k$=47 and q=21;
$M_k$=47 and q=23;
$M_k$=47 and q=24;
$M_k$=47 and q=26;
$M_k$=47 and q=28;
$M_k$=47 and q=30;
$M_k$=47 and q=31;
$M_k$=47 and q=33;
$M_k$=47 and q=35;
$M_k$=47 and q=39;
$M_k$=47 and q=46;
$M_k$=87 and q=37;
$M_k$=87 and q=50;
$M_k$=117 and q=10;
$M_k$=117 and q=107;
$M_k$=125 and q=27;
$M_k$=125 and q=98;
$M_k$=129 and q=14;
$M_k$=129 and q=115;
$M_k$=151 and q=69;
$M_k$=151 and q=82;

$M_k$=223 and q=83; and
$M_k$=223 and q=140.

For the ZC sequence that meets the low PAPR/RCM requirement, if $M_k$ is given, the value of q is as follows:

$$q=1; \text{ or}$$

$$q = M_k - 1; \text{ or}$$

$$q = \left\lfloor \frac{M_k}{Q} + 0.5 \right\rfloor; \text{ or}$$

$$q = M_k - \left\lfloor \frac{M_k}{Q} + 0.5 \right\rfloor,$$

where
$\lfloor\ \rfloor$ represents rounding down, $$1 < Q \le \left\lfloor \frac{M_k}{2} \right\rfloor,$$

and $M_k$ mod Q=1 or $M_k$ mod Q=Q−1.

Alternatively, q may be represented as follows in formula (5):

$$q = \begin{cases} 1 \text{ or } M_k - 1, & Q = 1 \\ \lfloor M_k/Q + 1/2 \rfloor \text{ or } & M_k \bmod Q = 1 \text{ or} \\ M_k - \lfloor M_k/Q + 1/2 \rfloor, & M_k \bmod Q = Q - 1, Q > 1 \end{cases} \quad (5.)$$

Whether the value of q is $\lfloor M_k/Q+½ \rfloor$ or $M_k-\lfloor M_k/Q+½ \rfloor$ may be determined based on a root sequence number indication $q_{idx}$. For example, $\lfloor M_k/Q+½ \rfloor$ is selected when $q_{idx}$ mod 2=0; and $M_k-\lfloor M_k/Q+½ \rfloor$ is selected when $q_{idx}$ mod 2=1. Therefore, the formula (5) becomes a formula (6):

$$q = \begin{cases} M_k/2 + (-1)^{\wedge q_{idx}} \cdot (1 - M_k/2), & Q = 1 \\ M_k/2 + (-1)^{\wedge q_{idx}} \cdot & M_k \bmod Q = 1 \text{ or} \\ (\lfloor M_k/Q + 1/2 \rfloor - M_k/2), & M_k \bmod Q = Q - 1, Q \ge 1 \end{cases} \quad (6.)$$

For a ZC sequence with a specified length, a larger value of Q usually indicates a higher PAPR/RCM of a reference signal sequence generated based on the determined q.

For the ZC sequence that meets the low PAPR/RCM requirement, when $M_k$ is given, the value of q may be alternatively represented as follows in formula (7):

$$q=q'; \text{ or}$$

$$q=M_k-q', \text{ where}$$

$$M_k \bmod q'=1 \text{ or } M_k \bmod q'=q'-1, \text{ and } 1 \le q' \le \lfloor M_k/2 \rfloor. \quad (7.)$$

When $M_k$ is given, a method for determining the value of q is applicable to determining a root ZC sequence that meets the low PAPR/RCM requirement from ZC sequences with one length or ZC sequences with a plurality of lengths. Root ZC sequences with a same length have a very good cross-correlation property (e.g., cross-correlation values are small). However, a limited quantity of root ZC sequences that meet the low PAPR/RCM requirement are determined from the ZC sequences with one length. More root ZC sequences can be found by determining the root ZC sequence that meets the low PAPR/RCM requirement from the ZC sequences with a plurality of lengths. However, root ZC sequences with different lengths have a relatively poor cross-correlation property (e.g., cross-correlation values are large). Determining the root ZC sequence that meets the low PAPR/RCM requirement from the ZC sequences with a plurality of lengths may be applied to a scenario in which there is a low requirement for a cross-correlation of a reference signal. For example, different reference signals do not overlap in frequency domain.

The foregoing method embodiment provides a reference signal sequence generation method. The reference signal sequence generated by using the method is characterized by a low PAPR/RCM. When the reference signal sequence is applied to the communications system, data transmission performance can be improved.

Figure 4:
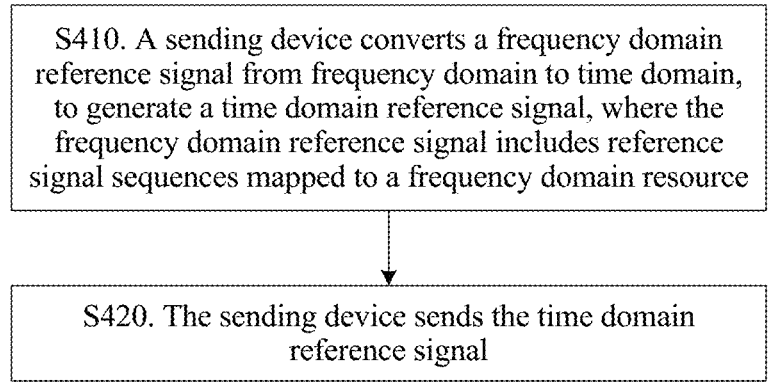
FIG. 4 is a flow chart of a reference signal transmission method applied to a sending device according to an embodiment of this application.

An embodiment of this application further provides a reference signal transmission method, as shown in FIG. 4.

Operation S410. A sending device converts a frequency domain reference signal from frequency domain to time domain, to generate a time domain reference signal, where the frequency domain reference signal includes a reference signal sequence mapped to a frequency domain resource, the reference signal sequence is determined based on a ZC sequence, and a length value of the ZC sequence is selected from at least two length values. The reference signal sequence is generated by using the foregoing method. Details are not described herein again.

In one embodiment, before mapping the reference signal sequence to the frequency domain resource to generate the frequency domain reference signal, the sending device may further obtain the reference signal sequence. In one embodiment, the sending device may be obtaining a generated reference signal sequence from a memory, or may be generating a reference signal sequence in real time according to a formula.

In one embodiment, the frequency domain resource includes a first frequency domain resource group and a second frequency domain resource group, and the second frequency domain resource group and the first frequency domain resource group include a same quantity of basic time-frequency resource units and have no overlapping basic time-frequency resource unit. The reference signal sequence includes a first reference signal sequence and a second reference signal sequence. The first reference signal sequence is mapped to the first frequency domain resource group, and the second reference signal sequence is mapped to the second frequency domain resource group. The basic time-frequency resource unit may have different definitions in different systems. For example, the basic time-frequency resource unit in an LTE system is a resource element (resource element, RE).

The first frequency domain resource group and the second frequency domain resource group may be any two of a frequency domain resource group 0 to a frequency domain resource group G−1 in FIG. 3, where G is an integer greater than 1. As shown in FIG. 3, G reference signal sequences are mapped to G frequency domain resource groups respectively, to generate a frequency domain reference signal, and the frequency domain reference signal is converted from frequency domain to time domain, to generate a time domain reference signal.

A common method for conversion from frequency domain to time domain is inverse discrete Fourier transform (IDFT) and inverse fast Fourier transform (IFFT). However, embodiments of this application are not limited to these methods.

Operation S420. The sending device sends the time domain reference signal.

It may be understood that, before sending the time domain reference signal, the sending device may further perform processing such as digital-to-analog conversion (converting a digital signal into an analog signal) and carrier modulation (modulating a baseband signal to a radio frequency carrier), and then transmit the time domain reference signal by using an antenna.

Figure 5:
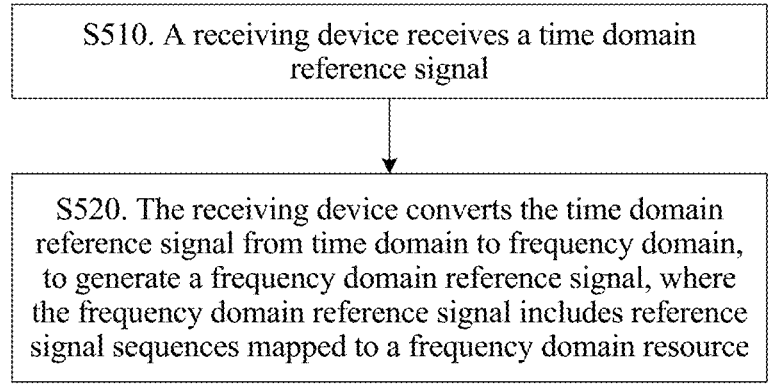
FIG. 5 is a flow chart of a reference signal transmission method applied to a receiving device according to an embodiment of this application.

An embodiment of this application further provides another reference signal transmission method, as shown in FIG. 5.

Operation S510. A receiving device receives a time domain reference signal.

It may be understood that the receiving device receives a radio signal from a radio channel by using an antenna, and the radio signal includes the time domain reference signal.

Operation S520. The receiving device converts the time domain reference signal from time domain to frequency domain, to generate a frequency domain reference signal, where the frequency domain reference signal includes a reference signal sequence mapped to a frequency domain resource, the reference signal sequence is determined based on a ZC sequence, and a length value of the ZC sequence is selected from at least two length values. The reference signal sequence is generated by using the foregoing method. Details are not described herein again.

A common method for conversion from time domain to frequency domain is discrete Fourier transform (IDFT) and fast Fourier transform (IFFT). However, embodiments of this application are not limited to these methods.

The receiving device may perform measurement based on the frequency domain reference signal or a time domain reference signal. The measurement herein may include: estimating a parameter of a radio channel between a sending device and the receiving device, where a parameter estimation result of the radio channel may be used to demodulate data sent by the sending device; measuring quality of the channel between the sending device and the receiving device, where a quality measurement result of the channel may be used for link adaptation and resource allocation of data transmission between the sending device and the receiving device; and measuring a signal propagation time or a propagation time difference between the sending device and the receiving device, where a measurement result of the propagation time or the propagation time difference may be used to determine a geographical location of the sending device or a geographical location of the receiving device. An application and a type of the reference signal are not limited in this application.

In actual application, the sending device may select one ZC sequence from ZC sequences that meet a PAPR/RCM requirement, and the selected ZC sequence is used to generate the reference signal sequence. A method for obtaining the ZC sequence by the sending device may be obtaining a generated ZC sequence from a memory, or may be generating a ZC sequence in real time based on a related parameter of the ZC sequence. Alternatively, the sending device may select one group of related parameters of the ZC sequence or one related parameter of the ZC sequence from a related parameter set of the ZC sequence, to generate the ZC sequence and further generate the reference signal sequence based on the ZC sequence.

A method for obtaining the related parameter of the ZC sequence by the sending device may be obtaining the related parameter from the memory. Alternatively, a network device uniformly allocates the ZC sequence and then sends the related parameter of the ZC sequence to the sending device by using signaling. The sending device generates the ZC sequence by using the related parameter of the ZC sequence, to further generate the reference signal sequence. The related parameter of the ZC sequence herein may be a related parameter used to indicate $M_k$ and q, for example, a root sequence number indication $q_{idx}$, the length value $M_k$ of the ZC sequence, and a value q of a root of the ZC sequence. The network device herein may be an NodeB, an evolved NodeB (eNodeB), a base station in a 5G communications system, or another network device.

To complete measurement of the reference signal, the receiving device further needs to obtain reference signal sequence used for the received reference signal. A method for obtaining the reference signal sequence by the receiving device may be first obtaining a related parameter of the ZC sequence used to generate the reference signal sequence, and then generating the ZC sequence by using the parameter, to further generate the reference signal sequence. A method for obtaining the related parameter of the ZC sequence by the receiving device may be as follows: After obtaining the ZC sequence used for the reference signal sequence, the sending device may send the related parameter of the ZC sequence to the receiving device by using signaling; or the network device may send the related parameter of the ZC sequence to the receiving device by using signaling.

The sending device and the receiving device may further obtain the related parameter of the ZC sequence in an implicit manner, for example, by implicitly determining the related parameter of the ZC sequence by using a cell identifier and a time-slot number, or the like.

The sending device and the receiving device may store a correspondence between a value of a root sequence number indication $q_{idx}$ and a value of a root q by using a table, or the sending device and the receiving device may calculate a correspondence between a value of a root sequence number indication $q_{idx}$ and a value q of a root based on $M_k$.

A method for determining the correspondence between a value of a root sequence number indication $q_{idx}$ and a value of a root q by the sending device and the receiving device based on $M_0$ is shown below by using $M_0$ as an example. The method is described in a form of pseudocode as follows:

```
Set q_idx = -1
Set Q=1
while (Q ≤ ⌊M_0 / 2⌋ and q_idx < N_q -1)
    if Q=1
        q_idx = q_idx +1
        q̃(q_idx) = 1
        q_idx = q_idx +1
        q̃(q_idx) = M_0 - 1
    else
        if ((M_0 mod Q) = 1 or (M_0 mod Q)=Q-1)
            q_idx = q_idx +1
            q̃(q_idx) = ⌊M_0 / Q + 1 / 2⌋
            q_idx = q_idx +1
            q̃(q_idx) = M_0 - ⌊M_0 / Q + 1 / 2⌋
        end if
    end if
    Q=Q+1;
end while
```

In the foregoing loop, $q̃$ indicates a set of values of the root q that are corresponding to the root sequence number indication $q_{idx}$ (starting from 0). When the root sequence number indication $q_{idx}$ is known, a currently used root $q = q̃(q_{idx})$ may be obtained. In the foregoing loop, $N_q$ indicates a required quantity of roots. For example, when there are four RBs, 30 roots are required.

The method for determining the correspondence between a value of a root sequence number indication $q_{idx}$ and a value of a root q may be described in another manner, for example:

```
Set q_idx =0
Set Q=1
while (Q ≤ ⌊M_0 / 2⌋ and q_idx < N_q)
    if Q=1
        q̃(q_idx) = 1
        q_idx = q_idx +1
        q̃(q_idx) = M_0 - 1
        q_idx = q_idx +1
    else
        if ((M_0 mod Q)= 1 or (M_0 mod Q) = Q-1)
            q̃(q_idx) = ⌊M_0 / Q + 1 / 2⌋
            q_idx = q_idx +1
            q̃(q_idx) = M_0 - ⌊M_0 / Q + 1 / 2⌋
            q_idx= q_idx +1
        end if
    end if
    Q=Q+1;
end while
```

When a relatively small quantity of RB resources are allocated, a quantity of roots determined by using the foregoing loop may be less than a required quantity $N_q$. In this case, some of remaining root sequence numbers may be selected in ascending order or in descending order as a supplement.

For example, 40 RBs are allocated, $M_0=479$, and $N_q=30$ roots are required. The value q of the root corresponding to the root sequence number indication $q_{idx}$ determined by using the foregoing loop is shown in Table 4. In Table 4, for reference signal sequences each with a length of 40 RBs and that are determined based on 30 roots, PAPRs are less than 3.4 dB and RCMs are less than 1.9 dB. The reference signal sequences may be used as a reference signal of a waveform with a low PAPR.

TABLE 4

| | $q_{idx}$ | | | | | | | | | |
|---|---|---|---|---|---|---|---|---|---|---|
| | 0 | 1 | 2 | 3 | 4 | 5 | 6 | 7 | 8 | 9 |
| q | 1 | 478 | 240 | 239 | 160 | 319 | 120 | 359 | 96 | 383 |
| | $q_{idx}$ | | | | | | | | | |
| | 10 | 11 | 12 | 13 | 14 | 15 | 16 | 17 | 18 | 19 |
| q | 80 | 399 | 60 | 419 | 48 | 431 | 40 | 439 | 32 | 447 |
| | $q_{idx}$ | | | | | | | | | |
| | 20 | 21 | 22 | 23 | 24 | 25 | 26 | 27 | 28 | 29 |
| q | 30 | 449 | 24 | 455 | 20 | 459 | 16 | 463 | 15 | 464 |

In the foregoing embodiments provided in this application, solutions such as the reference signal sequence generation method and the reference signal transmission method provided in the embodiments of this application are separately described from perspectives of the sending device, the receiving device, and interaction between the sending device and the receiving device. It may be understood that, to implement the foregoing functions, each device such as the sending device or the receiving device includes a corresponding hardware structure and/or a corresponding software module for performing each function. A person skilled in the art should easily be aware that, in combination with the examples described in the embodiments disclosed in this specification, units and method operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but these implementations should be understood as falling within the scope of this application.

Figure 6:
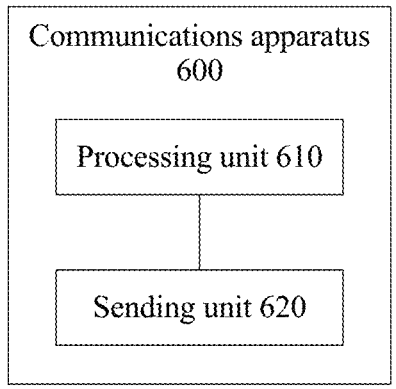
FIG. 6 is a block diagram of a communications apparatus according to an embodiment of this application.
Figure 7:
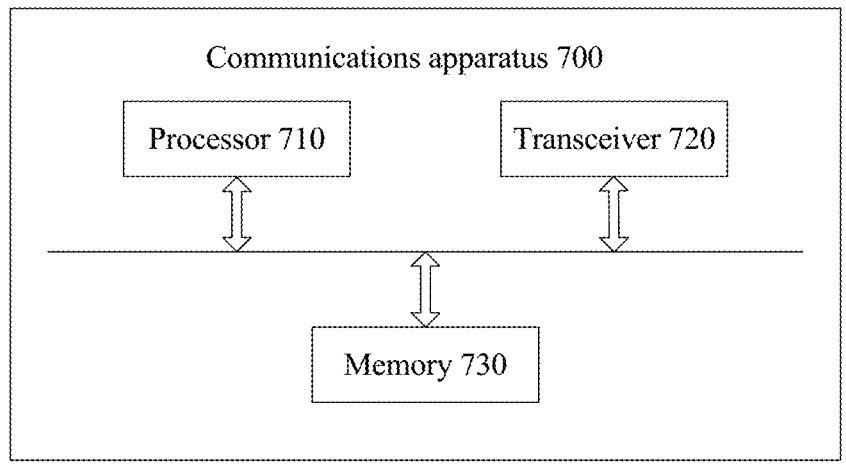
FIG. 7 is a block diagram of another communications apparatus according to an embodiment of this application.

FIG. 6 and FIG. 7 are block diagrams of two possible communications apparatuses according to embodiments of this application. The communications apparatus implements a function of a sending device in the foregoing reference signal transmission method embodiment, and therefore, a beneficial effect of the foregoing reference signal transmission method can also be implemented. In this embodiment of this application, the communications apparatus may be the UE 130, the UE 140, or the base station 120 shown in FIG. 1, or may be another transmit side device that performs wireless communication by using a reference signal.

As shown in FIG. 6, a communications apparatus 600 includes a processing unit 610 and a sending unit 620.

The processing unit 610 is configured to convert a frequency domain reference signal from frequency domain to time domain, to generate a time domain reference signal, where the frequency domain reference signal includes a reference signal sequence mapped to a frequency domain resource, the reference signal sequence is determined based on a ZC sequence, and a length value of the ZC sequence is selected from at least two length values.

The sending unit 620 is configured to send the time domain reference signal.

As shown in FIG. 7, a communications apparatus 700 includes a processor 710, a transceiver 720, and a memory 730. The memory 730 may be configured to store code executed by the processor 710. Components in the communications apparatus 700 communicate with each other by using an internal connection path. For example, the components transmit a control and/or data signal by using a bus.

The processor 710 is configured to convert a frequency domain reference signal from frequency domain to time domain, to generate a time domain reference signal, where the frequency domain reference signal includes a reference signal sequence mapped to a frequency domain resource, the reference signal sequence is determined based on a ZC sequence, and a length value of the ZC sequence is selected from at least two length values.

The transceiver 720 is configured to send the time domain reference signal.

For more detailed function descriptions of the processing unit 610, the processor 710, the sending unit 620, and the transceiver 720, refer to the foregoing method embodiment. Details are not described herein again.

Figure 8:
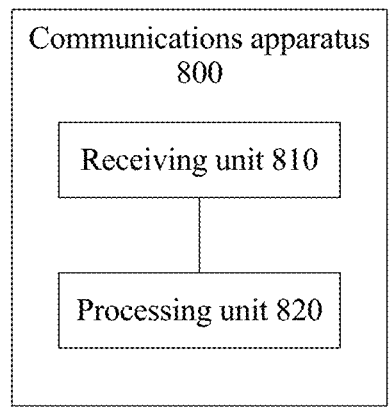
FIG. 8 is a block diagram of another communications apparatus according to an embodiment of this application.
Figure 9:
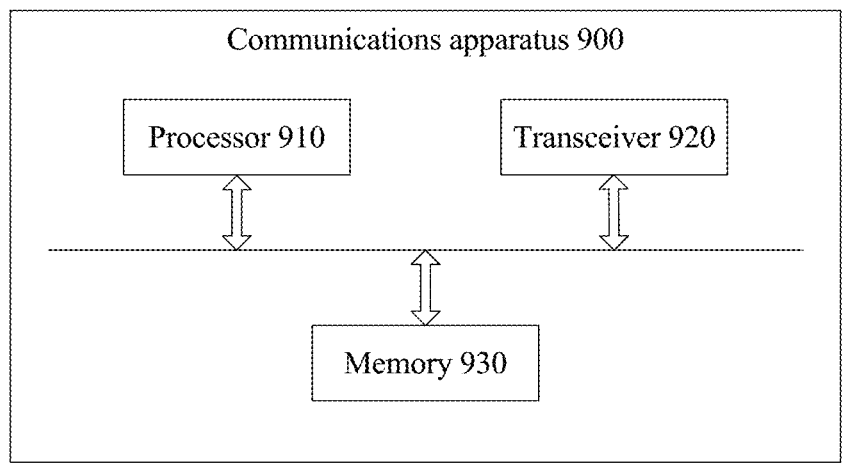
FIG. 9 is a block diagram of another communications apparatus according to an embodiment of this application.

FIG. 8 and FIG. 9 are block diagrams of two other possible communications apparatuses according to embodiments of this application. The communications apparatus implements a function of a receiving device in the foregoing reference signal transmission method embodiment, and therefore, a beneficial effect of the foregoing reference signal transmission method can also be implemented. In this embodiment of this application, the communications apparatus may be the UE 130, the UE 140, or the base station 120 shown in FIG. 1, or may be another receive side device that performs wireless communication by using a reference signal.

As shown in FIG. 8, a communications apparatus 800 includes a receiving unit 810 and a processing unit 820.

The receiving unit 810 is configured to receive a time domain reference signal.

The processing unit 820 is configured to convert the time domain reference signal from time domain to frequency domain, to generate a frequency domain reference signal, where the frequency domain reference signal includes a reference signal sequence mapped to a frequency domain resource, the reference signal sequence is determined based on a ZC sequence, and a length value of the ZC sequence is selected from at least two length values.

As shown in FIG. 9, a communications apparatus 900 includes a processor 910, a transceiver 920, and a memory 930. The memory 930 may be configured to store code executed by the processor 910. Components in the communications apparatus 900 communicate with each other by using an internal connection path. For example, the components transmit a control and/or data signal by using a bus.

The transceiver 920 is configured to receive a time domain reference signal.

The processor 910 is configured to convert the time domain reference signal from time domain to frequency domain, to generate a frequency domain reference signal, where the frequency domain reference signal includes a reference signal sequence mapped to a frequency domain resource, the reference signal sequence is determined based on a ZC sequence, and a length value of the ZC sequence is selected from at least two length values.

It may be understood that FIG. 7 and FIG. 9 show only designs of the communications apparatus. In actual application, the communications apparatus may include any quantity of transceivers, processors, memories, and the like. All communications apparatuses that can implement this application fall within the protection scope of this application.

For more detailed function descriptions of the receiving unit 810, the transceiver 920, the processing unit 820, and the processor 910, refer to the foregoing method embodiment. Details are not described herein again.

It may be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in the embodiments of this application may be implemented by hardware or may be implemented by executing a software instruction by a processor. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. In one embodiment, the storage medium may be a component of the processor. The processor and the storage medium may be located in the ASIC. In addition, the ASIC may be located in a sending device or a receiving device. In one embodiment, the processor and the storage medium may exist in the sending device or receiving device as discrete components.

All or some of the foregoing embodiments may be implemented by using software, hardware, firmware, or any combination thereof. When being implemented by using software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer readable storage medium, or may be transmitted by using the computer readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be understood that numerical numbers involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing descriptions are merely specific implementations of the embodiments of this application. Any variation or replacement readily figured out by a person skilled in the art within the technical scope disclosed in this application shall fall within the protection scope in the embodiments of this application.

What is claimed is:

1. A reference signal transmission method, comprising:
converting, by a sending device, a frequency domain reference signal from a frequency domain to a time domain, to generate a time domain reference signal, wherein the frequency domain reference signal comprises a reference signal sequence mapped to a frequency domain resource, wherein the reference signal sequence is determined based on a Zadoff-Chu sequence, and wherein a length value of the Zadoff-Chu sequence is selected from at least two length values, wherein the Zadoff-Chu sequence is $X_q(m)$, wherein the $X_q(m)$ is determined according to $$X_q(m) = e^{-j\frac{\pi \cdot q \cdot m \cdot (m+1)}{M_k}},$$

wherein m represents a sequence number of an element of the Zadoff-Chu sequence, m is an integer and $0 \le m \le M_k-1$, $M_k$ represents the length value of the Zadoff-Chu sequence, k is an integer and $0 \le k \le K-1$, wherein K represents a quantity of the length values of the Zadoff-Chu sequence, K is an integer greater than 1, and q represents a value of a root of the Zadoff-Chu sequence, and wherein q and $M_k$ are relatively prime; and sending, by the sending device, the time domain reference signal.

2. The method according to claim 1, wherein a value of q comprises one or more of:

$$q = 1; \text{ or}$$

$$q = M_k - 1; \text{ or}$$

$$q = \left\lfloor \frac{M_k}{Q} + 0.5 \right\rfloor; \text{ or}$$

$$q = M_k - \left\lfloor \frac{M_k}{Q} + 0.5 \right\rfloor,$$

wherein
⌊ ⌋ represents rounding down, wherein $$1 < Q \le \left\lfloor \frac{M_k}{2} \right\rfloor,$$

and wherein $M_k$ mod Q=1 or $M_k$ mod Q=Q-1.

3. The method according to claim 1, wherein a value of q comprises one or more of:

$$q=q'; \text{ or}$$

$$q=M_k-q', \text{ wherein}$$

$M_k$ mod $q'$=1 or $M_k$ mod $q'$=$q'$-1, and wherein $1 \le q' \le \lfloor M_k/2 \rfloor$.

4. The method according to claim 1, wherein a length of the reference signal sequence is 48, wherein a value of $M_k$ and a value of q of the Zadoff-Chu sequence are one type in a parameter value set, wherein the value of $M_k$ in the parameter value set has at least two different values, and wherein the parameter value set comprises at least two of:
$M_k$=47 and q=1;
$M_k$=47 and q=8;
$M_k$=47 and q=12;
$M_k$=47 and q=14;
$M_k$=47 and q=16;
$M_k$=47 and q=17;
$M_k$=47 and q=19;
$M_k$=47 and q=21;
$M_k$=47 and q=23;
$M_k$=47 and q=24;
$M_k$=47 and q=26;
$M_k$=47 and q=28;
$M_k$=47 and q=30;
$M_k$=47 and q=31;
$M_k$=47 and q=33;
$M_k$=47 and q=35;
$M_k$=47 and q=39;
$M_k$=47 and q=46;
$M_k$=87 and q=37;
$M_k$=87 and q=50;
$M_k$=117 and q=10;
$M_k$=117 and q=107;
$M_k$=125 and q=27;
$M_k$=125 and q=98;
$M_k$=129 and q=14;
$M_k$=129 and q=115;
$M_k$=151 and q=69;
$M_k$=151 and q=82;
$M_k$=223 and q=83; or
$M_k$=223 and q=140.

5. The method according to claim 1, wherein the reference signal sequence is $R_q(n)$, wherein the $R_q(n)$ is determined according to $R_q(n)=e^{j \cdot \alpha \cdot n} X_q(n \text{ mod } M_k)$, wherein
n is an integer and $0 \le n \le N-1$, wherein N represents a length of the reference signal sequence, N is an integer greater than 1; and
α represents a phase of linear phase rotation, and α is a real number.

6. The method according claim 1, wherein
the frequency domain resource comprises a first frequency domain resource group and a second frequency domain resource group, wherein the second frequency domain resource group and the first frequency domain resource group comprise a same quantity of a basic time-frequency resource unit and have no overlapping of the basic time-frequency resource unit;
the reference signal sequence comprises a first reference signal sequence and a second reference signal sequence; and
the first reference signal sequence is mapped to the first frequency domain resource group, and the second reference signal sequence is mapped to the second frequency domain resource group.

7. A communications apparatus, comprising:
a processing unit, configured to convert a frequency domain reference signal from a frequency domain to a time domain, to generate a time domain reference signal, wherein the frequency domain reference signal comprises a reference signal sequence mapped to a frequency domain resource, wherein the reference signal sequence is determined based on a Zadoff-Chu sequence, and wherein a length value of the Zadoff-Chu sequence is selected from at least two length values, wherein the Zadoff-Chu sequence is $X_q(m)$, wherein the $X_q(m)$ is determined according to $$X_q(m) = e^{-j\frac{\pi \cdot q \cdot m \cdot (m+1)}{M_k}},$$

wherein m represents a sequence number of an element of the Zadoff-Chu sequence, m is an integer and $0 \le m \le M_k-1$, $M_k$ represents the length value of the Zadoff-Chu sequence, k is an integer and $0 \le k \le K-1$, wherein K represents a quantity of the length values of the Zadoff-Chu sequence, K is an integer greater than 1, and q represents a value of a root of the Zadoff-Chu sequence, and wherein q and $M_k$ are relatively prime; and
a sending unit, configured to send the time domain reference signal.

8. The communications apparatus according to claim 7, wherein a value of q comprises one or more of:

$$q = 1; \text{ or}$$

$$q = M_k - 1; \text{ or}$$

$$q = \left\lfloor \frac{M_k}{Q} + 0.5 \right\rfloor; \text{ or}$$

$$q = M_k - \left\lfloor \frac{M_k}{Q} + 0.5 \right\rfloor,$$

wherein $\lfloor \ \rfloor$ represents rounding down, wherein $$1 < Q \leq \left\lfloor \frac{M_k}{2} \right\rfloor,$$

and wherein $M_k$ mod Q=1 or $M_k$ mod Q=Q−1.

9. The communications apparatus according to claim 7, wherein a value of q comprises one or more of:

$q=q'$; or $q=M_k-q'$, wherein $M_k$ mod $q'$=1 or $M_k$ mod $q'$=1, and wherein $1 \leq q' \leq \lfloor M_k/2 \rfloor$.

10. The communications apparatus according to claim 7, wherein a length of the reference signal sequence is 48, wherein a value of $M_k$ and a value of q of the Zadoff-Chu sequence are one type in a parameter value set, wherein the value of $M_k$ in the parameter value set has at least two different values, and wherein the parameter value set comprises at least two of:

$M_k$=47 and q=1;
$M_k$=47 and q=8;
$M_k$=47 and q=12;
$M_k$=47 and q=14;
$M_k$=47 and q=16;
$M_k$=47 and q=17;
$M_k$=47 and q=19;
$M_k$=47 and q=21;
$M_k$=47 and q=23;
$M_k$=47 and q=24;
$M_k$=47 and q=26;
$M_k$=47 and q=28;
$M_k$=47 and q=30;
$M_k$=47 and q=31;
$M_k$=47 and q=33;
$M_k$=47 and q=35;
$M_k$=47 and q=39;
$M_k$=47 and q=46;
$M_k$=87 and q=37;
$M_k$=87 and q=50;
$M_k$=117 and q=10;
$M_k$=117 and q=107;
$M_k$=125 and q=27;
$M_k$=125 and q=98;
$M_k$=129 and q=14;
$M_k$=129 and q=115;
$M_k$=151 and q=69;
$M_k$=151 and q=82;
$M_k$=223 and q=83; or
$M_k$=223 and q=140.

11. The communications apparatus according to claim 7, wherein the reference signal sequence is $R_q(n)$, wherein the $R_q(n)$ is determined according to $R_q(n)=e^{j\cdot\alpha\cdot n}X_q(n \bmod M_k)$, wherein n is an integer and 0≤n≤N−1, wherein N represents a length of the reference signal sequence, N is an integer greater than 1; and α represents a phase of linear phase rotation, and α is a real number.

12. The communications apparatus according to claim 7, wherein the frequency domain resource comprises a first frequency domain resource group and a second frequency domain resource group, and the second frequency domain resource group and the first frequency domain resource group comprise a same quantity of a basic time-frequency resource unit and have no overlapping of the basic time-frequency resource unit;

the reference signal sequence comprises a first reference signal sequence and a second reference signal sequence; and the first reference signal sequence is mapped to the first frequency domain resource group, and the second reference signal sequence is mapped to the second frequency domain resource group.

13. A non-transitory computer readable storage medium, configured to store instructions, wherein when the instructions run on a computer, the computer performs operations comprising:

converting a frequency domain reference signal from a frequency domain to a time domain, to generate a time domain reference signal, wherein the frequency domain reference signal comprises a reference signal sequence mapped to a frequency domain resource, wherein the reference signal sequence is determined based on a Zadoff-Chu sequence, and wherein a length value of the Zadoff-Chu sequence is selected from at least two length values, wherein the Zadoff-Chu sequence is $X_q(m)$, wherein the $X_q(m)$ is determined according to $$X_q(m) = e^{-j\frac{\pi \cdot q \cdot m \cdot (m+1)}{M_k}},$$

wherein m represents a sequence number of an element of the Zadoff-Chu sequence, m is an integer and 0≤m≤$M_k$−1, $M_k$ represents the length value of the Zadoff-Chu sequence, k is an integer and 0≤k≤K−1, wherein K represents a quantity of the length values of the Zadoff-Chu sequence, K is an integer greater than 1, and q represents a value of a root of the Zadoff-Chu sequence, and wherein q and $M_k$ are relatively prime; and processing instructions for a transmitter to send the time domain reference signal.

14. The non-transitory computer readable storage medium of claim 13, wherein a value of q comprises one or more of:

$$q = 1; \text{ or}$$

$$q = M_k - 1; \text{ or}$$

$$q = \left\lfloor \frac{M_k}{Q} + 0.5 \right\rfloor; \text{ or}$$

$$q = M_k - \left\lfloor \frac{M_k}{Q} + 0.5 \right\rfloor,$$

wherein

⌊ ⌋ represents rounding down, wherein $$1 < Q \leq \left\lfloor \frac{M_k}{2} \right\rfloor,$$

and wherein $M_k \bmod Q = 1$ or $M_k \bmod Q = Q-1$.

15. The non-transitory computer readable storage medium of claim 13, wherein a length of the reference signal sequence is 48, wherein a value of $M_k$ and a value of q of the Zadoff-Chu sequence are one type in a parameter value set, wherein the value of $M_k$ in the parameter value set has at least two different values, and wherein the parameter value set comprises at least two of:

$M_k=47$ and q=1;
$M_k=47$ and q=8;
$M_k=47$ and q=12;
$M_k=47$ and q=14;
$M_k=47$ and q=16;
$M_k=47$ and q=17;
$M_k=47$ and q=19;
$M_k=47$ and q=21;
$M_k=47$ and q=23;
$M_k=47$ and q=24;
$M_k=47$ and q=26;
$M_k=47$ and q=28;
$M_k=47$ and q=30;
$M_k=47$ and q=31;
$M_k=47$ and q=33;
$M_k=47$ and q=35;
$M_k=47$ and q=39;
$M_k=47$ and q=46;
$M_k=87$ and q=37;
$M_k=87$ and q=50;
$M_k=117$ and q=10;
$M_k=117$ and q=107;
$M_k=125$ and q=27;
$M_k=125$ and q=98;
$M_k=129$ and q=14;
$M_k=129$ and q=115;
$M_k=151$ and q=69;
$M_k=151$ and q=82;
$M_k=223$ and q=83; or
$M_k=223$ and q=140.

16. The non-transitory computer readable storage medium of claim 13, wherein the reference signal sequence is $R_q(n)$, wherein the $R_q(n)$ is determined according to $R_q(n) = e^{j \cdot \alpha \cdot n} X_q(n \bmod M_k)$, wherein n is an integer and $0 \leq n \leq N-1$, wherein N represents a length of the reference signal sequence, N is an integer greater than 1; and α represents a phase of linear phase rotation, and α is a real number.

17. The non-transitory computer readable storage medium of claim 13, wherein the frequency domain resource comprises a first frequency domain resource group and a second frequency domain resource group, wherein the second frequency domain resource group and the first frequency domain resource group comprise a same quantity of a basic time-frequency resource unit and have no overlapping of the basic time-frequency resource unit;

the reference signal sequence comprises a first reference signal sequence and a second reference signal sequence; and the first reference signal sequence is mapped to the first frequency domain resource group, and the second reference signal sequence is mapped to the second frequency domain resource group.

* * * * *

UNITED STATES PATENT AND TRADEMARK OFFICE
CERTIFICATE OF CORRECTION

PATENT NO. : 11,095,408 B2
APPLICATION NO. : 16/460201
DATED : August 17, 2021
INVENTOR(S) : Hu et al.

It is certified that error appears in the above-identified patent and that said Letters Patent is hereby corrected as shown below:

In the Claims

In Claim 4, Column 19, Line 66, delete "35," and insert --35;--.

In Claim 4, Column 19, Line 67, delete "39," and insert --39;--.

Signed and Sealed this
Third Day of May, 2022

Katherine Kelly Vidal
*Director of the United States Patent and Trademark Office*